July 28, 1964     M. B. PREEMAN     3,142,390
SELF-ERECTING PLANT
Original Filed June 8, 1959     5 Sheets-Sheet 3
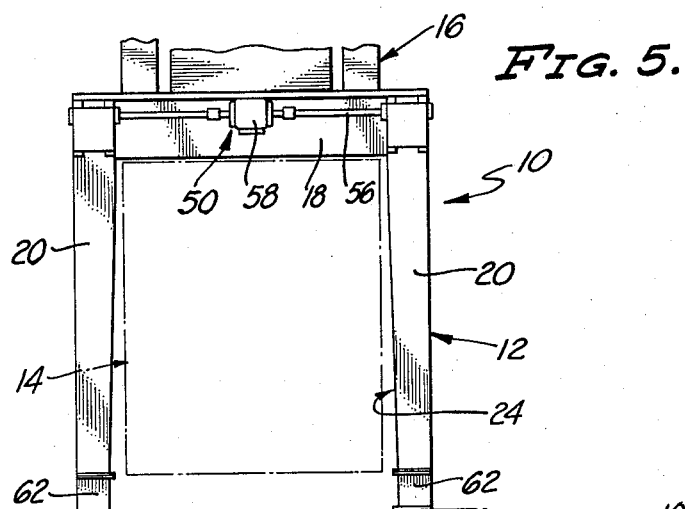
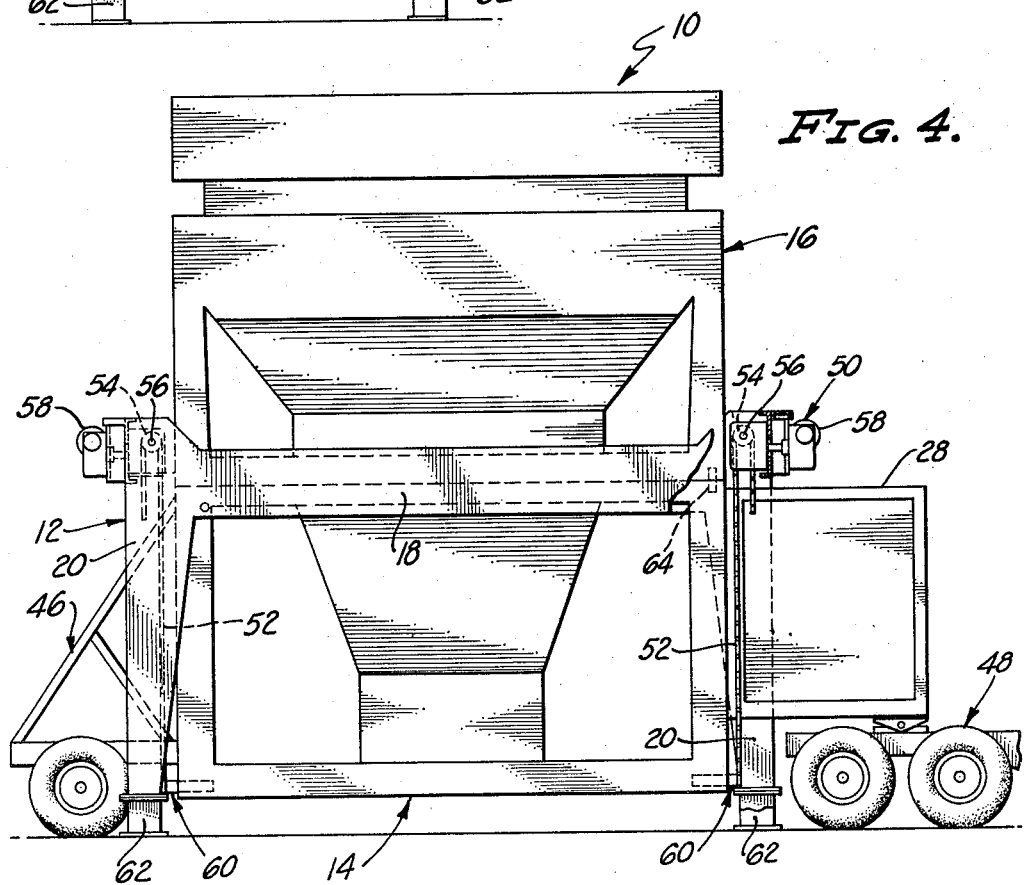
INVENTOR
MARVIN B. PREEMAN
BY HIS ATTORNEYS
HARRIS, KIECH, RUSSELL & KERN

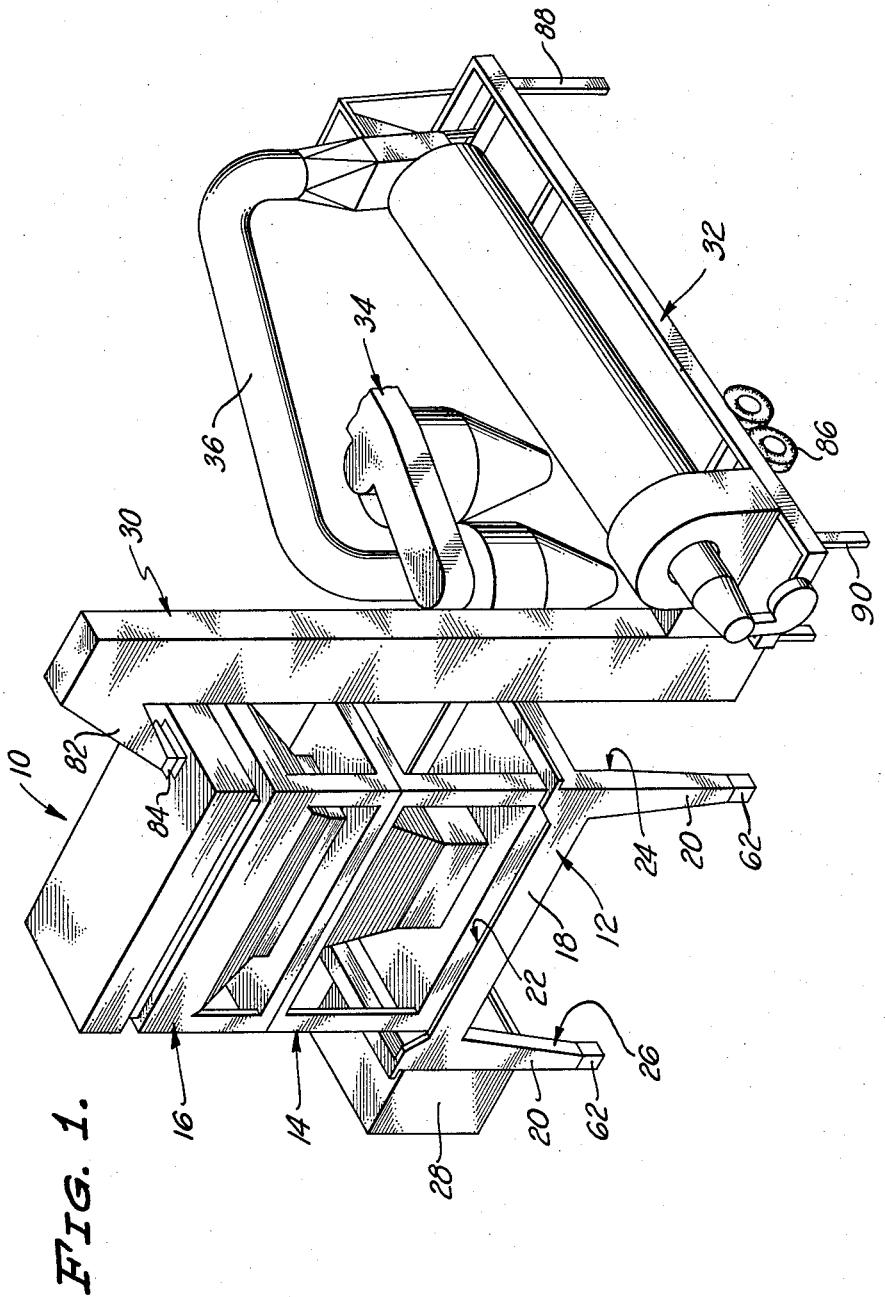

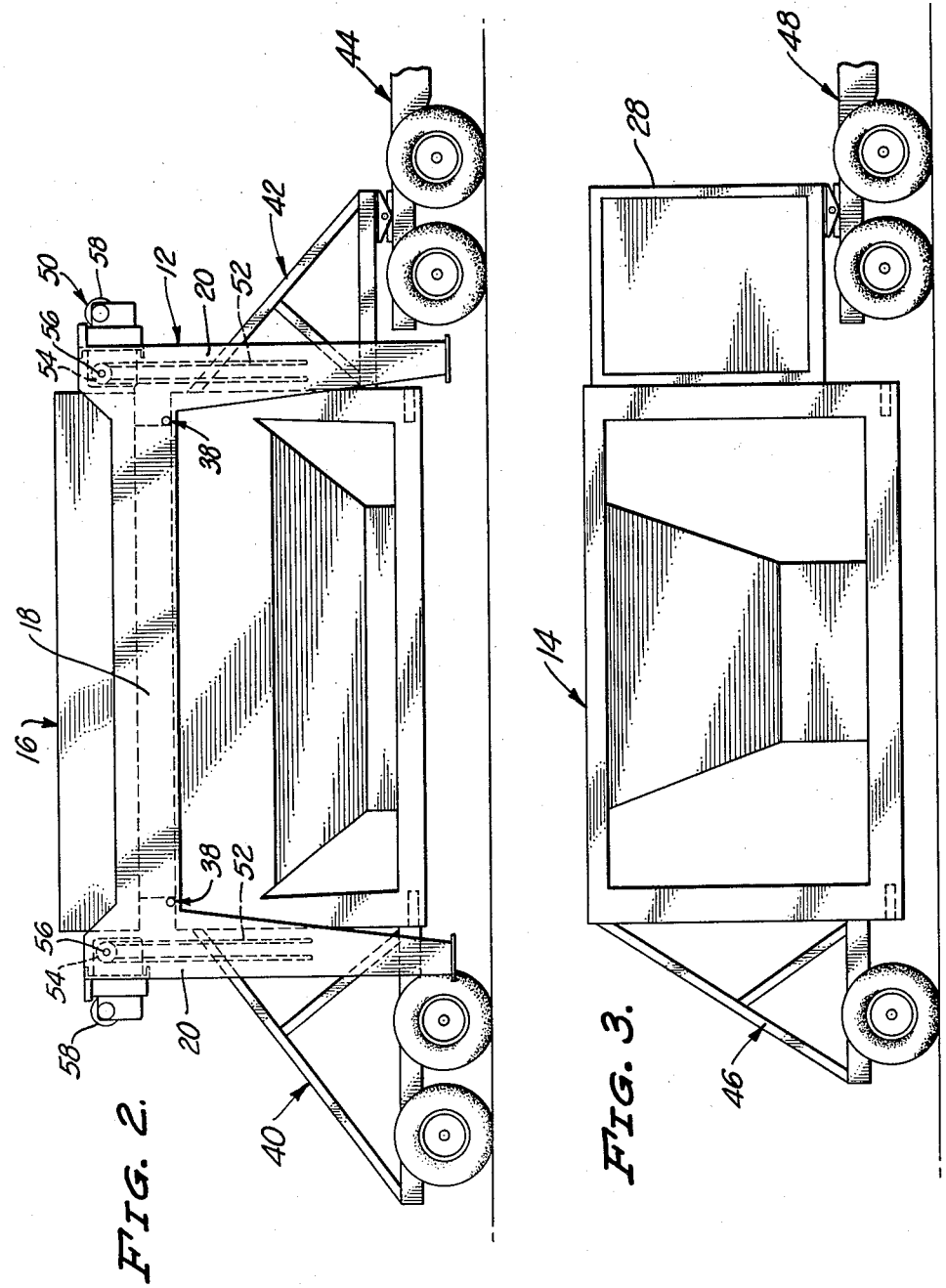

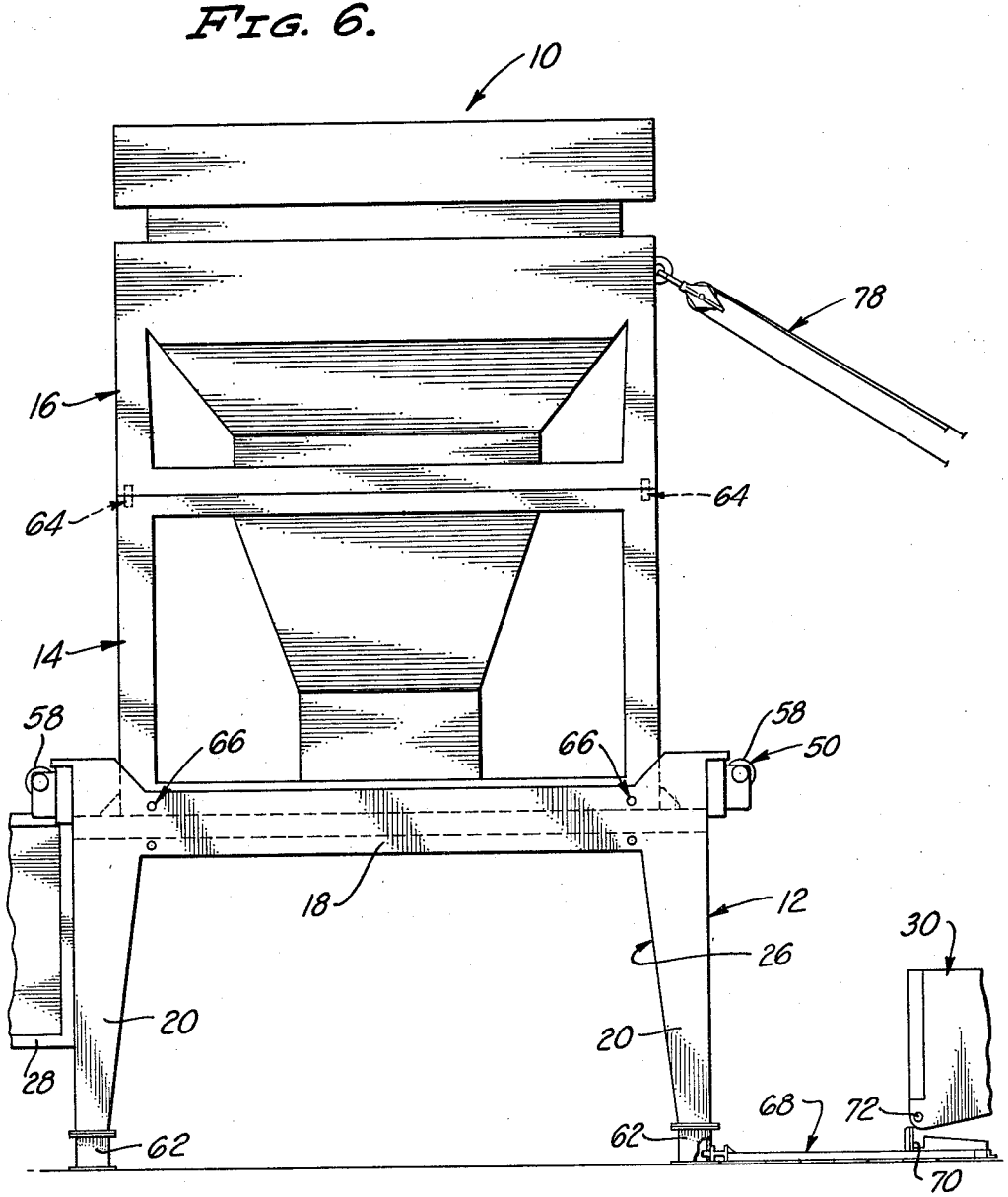

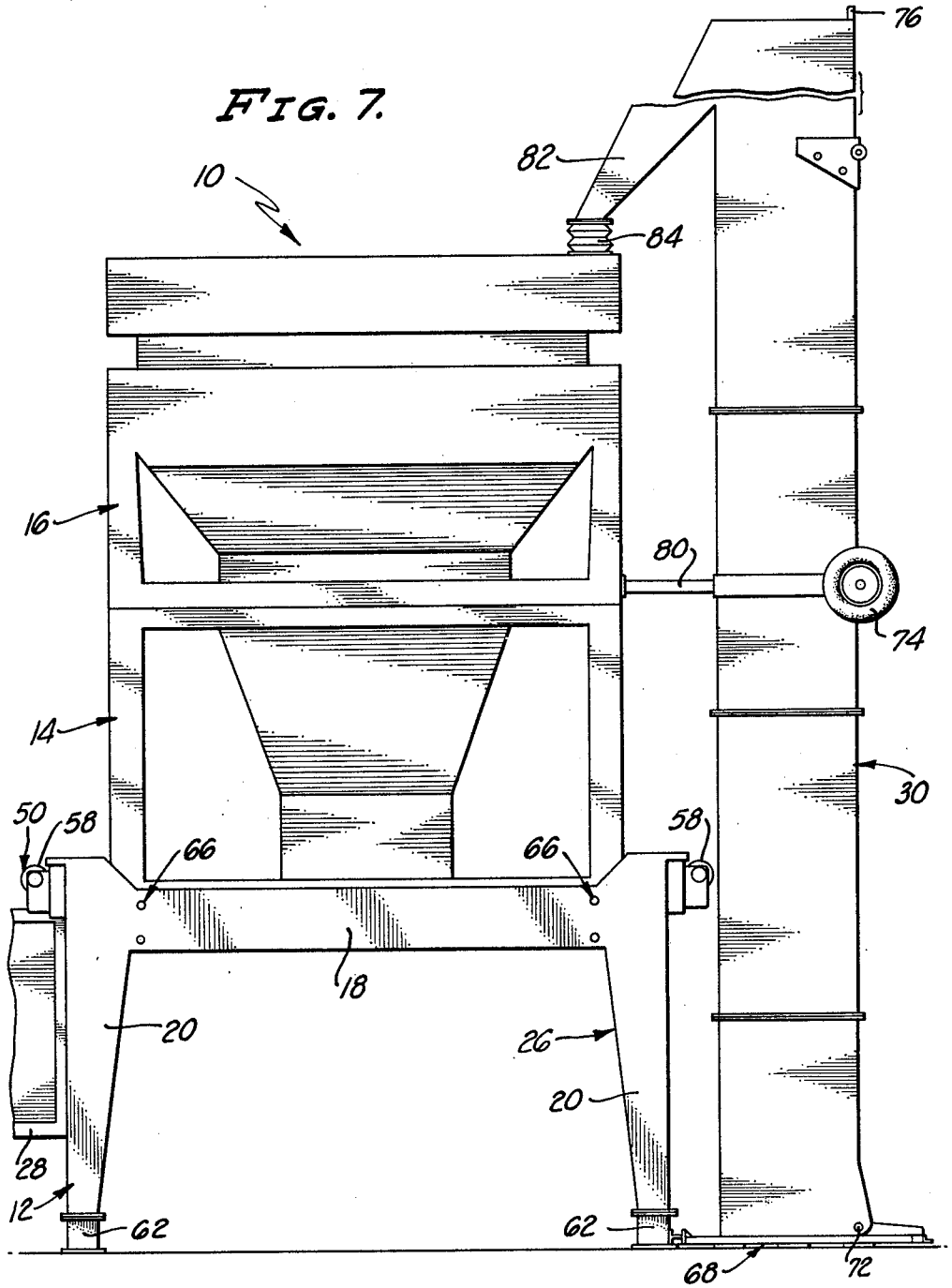

3,142,390
SELF-ERECTING PLANT
Marvin B. Freeman, Los Angeles, Calif., assignor to Standard Steel Corporation, Los Angeles, Calif., a corporation of California
Continuation of application Ser. No. 818,697, June 8, 1959. This application Feb. 9, 1962, Ser. No. 174,347
1 Claim. (Cl. 214—17)

The present invention relates to a self-erecting mobile plant and to a method of erecting various components thereof, the invention being particularly applicable to a mixing plant for preparing asphalt mixes, and the like, so that it will be considered in such connection herein for convenience. This application is a continuation of my application Serial No. 818,697, filed June 8, 1959, and now abandoned.

Considering the invention generally, it includes a tower comprising stacked base, intermediate and upper sections. Adjacent the tower is an elevator which receives hot aggregates from an aggregate drier and which discharges same into the upper tower section. The aggregates are screened in the upper tower section and discharged into bins therein according to size. The intermediate section of the tower is provided with means for weighing out aggregates from the bins in the upper or bin section and for mixing same with hot asphalt to produce the desired asphalt mix. The latter is discharged from the intermediate or mixing and weighing section into a truck, or the like, therebeneath in a horizontal truck passageway through the base section of the tower.

The foregoing are the main components to be considered herein, although it will be understood that various other components typically associated with an asphalt plant may be used in conjunction with the components specifically mentioned.

A general object of the invention is to provide an asphalt plant of the foregoing character having completely mobile components which may be set up quickly so that the plant may be moved from one location or site to another in a minimum of time.

More particularly, a primary object of the invention is to provide an asphalt plant having self-erecting components which may be set up without the use of a crane, or similar equipment.

An important object of the invention is to provide an asphalt plant the base, intermediate and upper sections of which are erected by first elevating the upper section relative to the base section and then elevating the intermediate section relative to the base section with the upper section stacked on the intermediate section.

Another important object is to provide an asphalt plant wherein the upper and intermediate sections are elevated relative to the base section in the foregoing manner by a lifting or hoisting means on the base section so that the tower or tower structure formed by the base, intermediate and upper sections is self-erecting.

A further object is to provide an asphalt plant wherein the base and upper sections of the tower are simultaneously transported to the desired erection site as a unit, the lifting means on the base section then being operated to elevate the upper section, and the intermediate section thereafter being brought into position under the upper section and being elevated relative to the base section by the lifting means with the upper section stacked on the intermediate section.

A further object is to provide an asphalt plant wherein the base and upper sections are simultaneously transported by wheeled transport means connected to the upper tower section, the base section being carried "piggy back" by the upper section during transport.

A further object is to provide a base section having a horizontal, longitudinal passageway intersecting the lateral truck passageway mentioned previously, and having a vertical shaft intersecting both the longitudinal and lateral passageways, the intermediate tower section being movable through the longitudinal passageway into alignment with the vertical shaft and subsequently being movable upwardly through the vertical shaft with the upper tower section stacked thereon.

Another object is to provide a base section comprising an open, horizontal, rectangular frame having legs at its corners, thereby forming the longitudinal and lateral passageways and the vertical shaft mentioned.

Another important object of the invention is to erect the elevator by first pivotally anchoring the lower end thereof adjacent the base section of the tower and then pulling the elevator upwardly and toward the tower from a point on the tower to swing the elevator upwardly and toward the tower from a generally horizontal, transport position into an upright position.

Another object is to erect the elevator by a pulling means, preferably a block and tackle means, connected to the elevator adjacent the upper end thereof and connected to the upper or bin section of the tower.

The foregoing objects, advantages, features and results of the present invention, together with various other objects, advantages, features and results thereof which will be evident to those skilled in the art to which the invention relates, may be achieved with the exemplary embodiment of the invention described in detail hereinafter and illustrated in the accompanying drawings, wherein:

FIG. 1 is a semidiagrammatic isometric view illustrating the major components of an erected asphalt plant which embodies the invention;

FIG. 2 is a semidiagrammatic, side elevational view showing base and upper sections of a tower of the plant in transport condition;

FIG. 3 is a semidiagrammatic, side elevational view of an intermediate section of the tower in transport condition;

FIG. 4 is a semidiagrammatic, side elevational view showing the base, intermediate and upper sections of the tower in partially erected condition;

FIG. 5 is a semidiagrammatic, end elevational view showing the base, intermediate and upper tower sections in partially erected condition, the intermediate section being shown in broken lines;

FIG. 6 is a semidiagrammatic, side elevational view showing the tower completely erected and illustrating erection of an elevator of the plant, FIG. 6 being taken from the side opposite that shown in FIGS. 2, 3 and 4; and FIG. 7 is a semidiagrammatic, side elevational view, taken from the same side as FIG. 6, showing the tower and the elevator completely set up.

Referring particularly to FIG. 1 of the drawings for the present, the asphalt plant illustrated therein includes a tower or tower structure which is designated generally by the numeral 10 and which includes a base section 12, an intermediate section 14 and an upper section 16. The base section 12 includes an open, horizontal, rectangular frame 18 having legs 20 at its corners, this construction providing a vertical shaft 22 through which the upper and intermediate sections 16 and 14 may be elevated, a horizontal passageway 24 which intersects the vertical shaft 22 and through which the intermediate section 14 may be moved into alignment with the vertical shaft, and a horizontal passageway 26 which intersects the vertical shaft 22 and the horizontal passageway 24 and through which a truck, or the like, may be driven to receive a load of asphalt mix. The passageways 24 and 26 are perpendicular to each other and, as a matter of convenience, the passageway 24 is sometimes referred to herein as a longitudinal passageway and the passageway 26 is sometimes referred to as a lateral or truck passageway.

Mounted on the base section 12 at one end of the longitudinal passageway 24 is a housing 28 containing a control panel, not shown, for all of the electrical equipment associated with the plant. Some of this electrical equipment is referred to hereinafter.

The upper section 16 of the tower 10 includes means, not shown, for screening aggregates according to size and for discharging the screened aggregates into different bins, not shown. The intermediate section 14 includes means, not shown, for weighing out aggregates in the desired proportions from the upper or bin section 16 and includes means, not shown, for mixing same with asphalt obtained from a suitable source, not shown, forming part of the plant. The intermediate section 14 also includes means, not shown, for discharging the resulting asphalt mix into a truck in the truck passageway 26 therebeneath. The mixing and weighing section 14 and the bin section 16 are of conventional construction so that the foregoing general description thereof is sufficient for the purposes of the present disclosure, attention being directed, for example, to my Patent No. 2,805,052, granted September 3, 1957, if a more detailed description is desired.

Dried aggregates are supplied to the bin section 16 of the tower by an elevator 30 located adjacent the tower 10 at the end of the longitudinal passageway 24 opposite the control panel housing 28. The lower end of the elevator 30 communicates with the discharge end of a conventional aggregate drier 32. Dust discharged by the drier 32 is collected in a centrifugal or cyclone separator assembly 34 which is connected to the inlet end of the drier 32 by a duct 36, it being understood that there is counterflow of the aggregates being dried and the drying medium so that the latter flows from the discharge end of the drier to the inlet end thereof.

The foregoing are the major components of the asphalt plant and include all of those which are involved in the present invention. tI will be understood, however, that various other components may be added to those shown in FIG. 1 to make up a complete asphalt plant, such other components being well known in the art so that a description is unnecessary.

Considering now the method and means of the invention by which the tower 10 is erected, the upper or bin section 16 and the base section 12 are transported to the desired erection site as a single unit with the bin section 16 disposed within the vertical shaft 22 of the base section 12, all as shown in FIG. 2 of the drawings. While being transported, the base and bin sections 12 and 16 are temporarily interconnected by any suitable connecting means, designated generally by the numeral 38. Since the specific form of the connecting means 38 is not material to the present invention, no description thereof is necessary, it being understood that such connecting means may take various forms.

The base and bin sections 12 and 16 may be transported simultaneously as a unit by utilizing either section to transport the other. Preferably, the bin section 16 is utilized to transport the base section 12, the latter being carried in more or less "piggy back" fashion as FIG. 2 clearly shows. To achieve this mode of transportation, a suitable wheeled transport means 40 is suitably connected, in a manner not specifically shown, to one end of the bin section 16, and a suitable tongue section 42 is connected, in a manner not specifically shown, to the other end thereof. This converts the bin section 16 into a semitrailer which may be towed by a conventional tractor 44, such semitrailer carrying the base section 12 by virtue of the action of the connecting means 38.

Referring to FIG. 3, the intermediate or mixing and weighing section 14 of the tower 10 is transported to the erection site separately, a wheeled transport means 46 being suitably connected to one end of this section. The control panel housing 28 is temporarily connected, in any suitable manner, to the opposite end of the mixing and weighing section 14 to form a "goose neck" tongue attachable to a tractor 48. Thus, the mixing and weighing section 14 is also converted into a semitrailer towable by the tractor 48.

The base section 12 is provided with an elevating or hoisting or lifting means 50 which is shown as including four chains 52 respectively located adjacent the legs 20. The chains 52 are trained over sprockets 54 at the top of the base section 12, the two sprockets at each end of the base section being mounted on a lateral or transverse shaft 56. The shafts 56 are driven by electric motors 58 mounted on the respective ends of the base section 12. One end of each chain 52 is connectible to the bottom of either the bin section 16, or the mixing and weighing section 14, by any suitable connecting means. FIG. 4 shows diagrammatically connecting means 60 between the chains 52 and the mixing and weighing section 14, similar connecting means being provided between the chains and the upper or bin section 16.

When the base section 12 and the bin section 16 arrive at the site on which the tower 10 is to be erected, blocks or pads 62, FIGS. 1 and 4 to 7, are placed under the legs 20 of the base section and the chains 52 are connected to the bin section adjacent the bottom thereof by suitable connecting means, as hereinbefore discussed. This accomplished, the connecting means 38 are removed, the tongue structure 42 is disconnected from the tractor 44, and the wheeled transport means 40 and the tongue structure 42 are disconnected from the bin section. If necessary, the motors 58 of the hoisting means 50 may be energized to transfer some or all of the weight of the bin section 16 to the chains 52 to facilitate removal of the connecting means 38 and the transport means 40 and the tongue structure 42.

After the foregoing operations have been carried out, the motors 58 are caused to move the bin section 16 upwardly in the vertical shaft 22 until the bin section has been elevated relative to the base section 12 into a position slightly above that shown in FIG. 4 of the drawings. Then, the semitrailer comprising the mixing and weighing section 14 and the control panel housing 28 is towed through the longitudinal passageway 24 by the tractor 48 until the mixing and weighing section 14 is aligned with the vertical shaft 22. Next, the bin section 16 is lowered until it rests on the mixing and weighing section 14, these sections preferably being interconnected by any suitable connecting means 64, FIGS. 4 and 6.

After performing the foregoing operations, the chains 52 are disconnected from the bin section 16 and are connected to the mixing and weighing section 14 adjacent the bottom thereof, as by the connecting means 60. Preferably, the motors 58 are then energized to transfer part or all of the weight of the tower sections 14 and 16 and the control panel housing 28 to the chains 52, whereupon the tractor 48 may be driven away and the wheeled transport means 46 removed. At this point, the control panel housing 28 is suitably connected to the base section 12 and is subsequently disconnected from the mixing and weighing section 14, the elevating means 50 being utilized to place the control panel housing in the proper position for attachment to the base section 12, which attachment may be effected by any suitable means, not shown.

While the bin section 16 has been described as being stacked on the mixing and weighing section 14 immediately upon movement of the latter into position beneath the former, it will be understood that the bin section may be temporarily connected to the base section 12 in any suitable manner and that the mixing and weighing section may subsequently be moved upwardly into stacked relation therewith if desired.

The final operation in erecting the tower 10 is to energize the motors 58 in directions to elevate the mixing and weighing section 14, and the bin section 16 stacked thereon, into their operative positions, shown in FIGS. 6 and 7 of the drawings. Preferably, the mixing and weighing section 14 is then connected to the base section 12 by any suitable connecting means 66 so that the chains 52 are not required to support the mixing and weighing section and the bin section 16 while the plant is in operation. If desired, the chains 52 may be removed for storage while the plant is in operation.

Thus, the tower 10 in effect erects itself, the bin section 16 being elevated part of the way by the lifting means 50 and then being elevated into its final position by the mixing and weighing section 14 as the latter is elevated into its final position by the lifting means. Therefore, no crane, or other extraneous equipment, is required, which is an important feature of the invention.

Referring to FIGS. 6 and 7 of the drawings, a pad or base 68 for pivotally anchoring the lower end of the elevator 30 is then placed adjacent the base section 12, shown as at the end of the longitudinal passageway 24 opposite the control panel housing 28. The base 68 preferably abuts two of the legs 20 of the base section 12, or the blocks 62 therebeneath, and is suitably keyed thereto to hold it in place, as shown in FIG. 6. The lower end of the elevator 30 is pivotally connectible to the base 68, as by providing the latter with aligned notches 70 to receive aligned pivot pins 72 on the elevator.

The elevator 30 is preferably transported as a semi-trailer by providing it with wheels 74, FIG. 7, and a tongue or drawbar 76 for attachment to a tractor, it being understood that the center of gravity of the elevator is between the wheels and the drawbar. With this arrangement, the tractor and semitrailer combination may be backed toward the tower 10 until the pins 72 are above the notches 70 whereupon the pin may be dropped into the notches by rocking the elevator about the wheels 74. Subsequently, the elevator 30 is swung upwardly into its upright, operating position by pulling upwardly and toward the tower 10 from a point on the tower. As shown in FIG. 6, one end of a block and tackle means 78 is connected to the bin section 16 of the tower 10, the other end of the block and tackle means being connected to the tower, while in its generally horizontal position, adjacent the upper end thereof. The block and tackle means 78 is then utilized to pull the elevator 30 upwardly into its upright position, again without the use of any crane, or other extraneous equipment, which is an important feature.

To complete the installation of the elevator 30, a brace 80 thereon is suitably connected to the tower 10 and a discharge spout 82 of the elevator is connected to the bin section 16 by a flexible coupling 84. Although the wheels 74 are shown in place in FIG. 7, it will be understood that they may be removed prior to swinging the elevator 30 into its upright position.

The drier 32 is also preferably a semitrailer equipped with trailer wheels 86, whereby it may readily be moved into its operative position adjacent the elevator 30 by a tractor, not shown. The front end of the drier trailer is shown as supported by legs 88 and the rear end thereof is shown as supported by legs 90 to avoid carrying the weight of the drier on the wheels 86 while the plant is in operation. The separator assembly 34 may also be in the form of a semitrailer, not shown, to facilitate moving it into position adjacent the drier 32.

As previously pointed out, the complete plant may, and ordinarily will, include additional components and these may be transported in any suitable manner, similar, for example, to the manner in which the components described are transported.

It will be understood further that the various components shown in the drawings are illustrated rather diagrammatically and that many details have been omitted for clarity. For example, various ones of the components will have ladders, platforms, stairways, and the like, associated therewith, all of which have been omitted for the sake of clarity.

From the foregoing, it will be clear that the present invention provides a portable plant which is extremely mobile and which may be moved from one site to another and erected in a minimum of time and without calling for a crane, or similar equipment, to erect the tower 10 and the elevator 30. Although an exemplary embodiment has been disclosed for purposes of illustration, it will be understood that various changes, modifications and substitutions may be incorporated in such embodiment without departing from the spirit of the invention as defined by the claim which follows.

I claim:

In a self-erecting plant of the character described, the combination of:

(a) a base section comprising an open, horizontal, rectangular frame having legs at its corners to provide intersecting, horizontal, longitudinal and lateral passageways and a vertical shaft intersecting said longitudinal and lateral passageways;

(b) an upper section movable vertically through said vertical shaft between upper and lower positions and through an intermediate position;

(c) elevating means on said base section and connectible to said upper section for moving said upper section vertically in said vertical shaft between said intermediate and lower positions;

(d) means for connecting said base section to said upper section with said upper section in said lower position and with said base section mounted on said upper section for transport purposes;

(e) wheeled transport means connectible to said upper section for transporting said upper section with said upper section in said lower position and with said base section mounted on said upper section;

(f) an intermediate section movable through said longitudinal passageway into alignment with said vertical shaft after said upper section has been elevated relative to said base section into said intermediate position adapted to have said upper section stacked thereon;

(g) another wheeled transport means connectible to said intermediate section for transporting said intermediate section through said longitudinal passageway into alignment with said vertical shaft;

(h) said intermediate section being movable upwardly in said vertical shaft into an elevated position;

(i) means, including said elevating means and including means for connecting said elevating means to said intermediate section, for moving said intermediate section upwardly in said vertical shaft into said elevated position with said upper section stacked on said intermediate section;

(j) whereby to move said upper section upwardly into said upper position;

(k) an elevator adapted to extend from adjacent ground level to said upper section;

(l) another wheeled transport means connectible to said elevator with said elevator horizontal for transporting said elevator into a position adjacent said base section;

(m) means for pivotally anchoring the lower end of said elevator adjacent said base section; and (n) block and tackle means connectible to said upper section and said elevator, after said upper section has been moved upwardly into said upper position, for swinging said elevator upwardly from a generally horizontal position into an upright position.

References Cited in the file of this patent

UNITED STATES PATENTS

| | | |
|---|---|---|
| 2,207,303 | Prout et al. | July 9, 1940 |
| 2,298,160 | Pollitz | Oct. 6, 1942 |
| 2,717,439 | Bergstrom | Sept. 13, 1955 |
| 2,805,052 | Preeman | Sept. 3, 1957 |
| 2,863,531 | Campbell | Dec. 9, 1958 |
| 2,984,898 | Svensson | May 23, 1961 |
| 3,045,837 | Liebherr | July 24, 1962 |

FOREIGN PATENTS

| | | |
|---|---|---|
| 451,029 | France | Jan. 31, 1913 |
| 872,432 | Germany | Apr. 2, 1953 |